United States Patent [19]
Dunbar

[11] Patent Number: 5,372,048
[45] Date of Patent: Dec. 13, 1994

[54] FLOATING-TYPE TURBINE FLOW METER

[75] Inventor: Jeffrey R. Dunbar, San Jose, Calif.

[73] Assignee: Muir Products, Inc., Mountain View, Calif.

[21] Appl. No.: 192,985

[22] Filed: Feb. 8, 1994

Related U.S. Application Data

[63] Continuation of Ser. No. 811,176, Dec. 19, 1991, abandoned.

[51] Int. Cl.$^5$ ............................................. G01F 1/10
[52] U.S. Cl. ............................. 73/861.91; 73/861.89
[58] Field of Search ............ 73/861.79, 861.83, 861.89, 73/861.91, 861.92, 861.78, 861.52, 198

[56] References Cited

U.S. PATENT DOCUMENTS

| | | | |
|---|---|---|---|
| 2,299,406 | 10/1942 | Potter | 73/861.92 |
| 2,683,224 | 7/1954 | Cole | 73/861.77 |
| 2,842,963 | 7/1958 | Ardley | 73/861.91 |
| 3,053,087 | 9/1962 | Waugh | 73/861.78 |
| 3,164,020 | 1/1965 | Groner et al. | 73/231 |
| 3,342,070 | 9/1967 | Walclh | 73/231 |
| 3,840,051 | 8/1973 | Akashi et al. | 73/861.52 |
| 4,253,341 | 3/1981 | Ikeda et al. | 73/861.77 |
| 4,337,655 | 7/1982 | Sundstrom et al. | 73/861.77 |

Primary Examiner—Stephen Chin
Assistant Examiner—Timothy J. May
Attorney, Agent, or Firm—Flehr, Hohbach, Test, Albritton & Herbert

[57] ABSTRACT

A flowmeter which is usually attached to a garden hose or a home shower installation is provided which includes a pipe section in which is mounted a ducted turbine type rotor whose speed of rotation is sensed by an associated coil. The rotor is magnetically polarized. Laminar flow through the rotor which has several blades is provided by a relatively thin flow control plate upstream which in addition to making the flow laminar provides jets which impinge against the rotor blades. A downstream spindle plate also has apertures which isolate downstream turbulence and which includes a spindle shaft on which the rotor is freely mounted. In practice, the flow of the liquid provides a lift to the rotor which allows it to freely float on the spindle shaft to minimize friction. Thus, the overall design has improved accuracy and is very simple in construction.

11 Claims, 4 Drawing Sheets

FLOATING-TYPE TURBINE FLOW METER

This is a continuation of U.S. patent application Ser. No. 07/811,176 filed Dec. 19, 1991, now abandoned.

The present invention is directed to apparatus for measuring a liquid flow and process therefor and more specifically a flow meter which is usually attached to household water supplies; for example, a garden hose or home shower installation.

BACKGROUND OF THE INVENTION

The most common flowmeters used today are Venturi, modified Venturi, orifice plate, magnetic, turbine and propeller, sonic, vortex, and averaging Pitot flowmeters. The present invention is directed to a turbine type flowmeter where the flowing liquid strikes the rotor blades which rotate at a speed proportional to the liquid flow rate. The rotor of the turbine meter generally fills the cross section of the liquid containing pipe and is mounted to spin freely between two central bearings supported in a pipe wall.

To obtain commercial levels of accuracy, for example, 0.5% to 2% over at least 10 to 1 flow rates, these types of meters generally require lengthy flow straighteners along the axis of the pipe to reduce liquid turbulence. In short, for home use, the present design of the turbine flowmeter is too expensive and sophisticated.

OBJECT AND SUMMARY OF THE INVENTION

An object of the present invention is to provide an improved apparatus for measuring liquid flow and a process therefor.

In accordance with the above object from a process point of view, there is provided a process for measuring a liquid flow where a turbine rotor is in the path of the liquid flow and rotates around its axis at a speed proportional to the liquid flow rate and comprises the following steps. The liquid upstream of the rotor is converted from a condition of turbulence to one of substantially laminar flow, such flow impinging upon the rotor to rotate it. The rotor is mounted on an axis to allow relatively free movement along its axis but restricted movement perpendicular thereto. The turbulence downstream of the rotor is also isolated. And finally the rotational speed of the rotor is sensed.

DETAILED DESCRIPTION OF PREFERRED EMBODIMENTS

Figure 1:
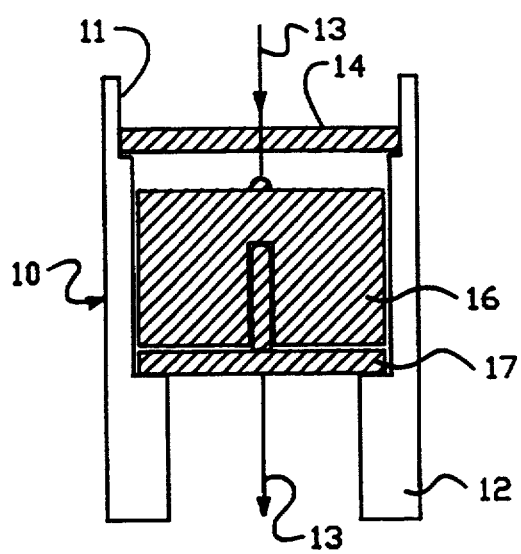
FIG. 1 is a simplified cross-sectional view of apparatus embodying the present invention.

FIG. 1 illustrates the overall invention which includes a pipe section 10 which has a threaded female end 11 into which, for example, a garden hose or home shower installation may be installed and a male end 12. Such pipe section 10 is illustrated in greater detail in FIG. 2. Referring back to FIG. 1, the pipe section 10 is installed in any pipeline where the liquid, generally water, has a flow direction indicated by the arrow 13. Thus the female portion 11 is the upstream portion of the liquid flow 13 and the male end 12 the downstream portion.

The apparatus for measuring the amount of liquid flow or the flow rate is in three components. The first component is a flow control plate 14 which is force fitted in pipe section 10 and serves the purpose of converting the upstream liquid from a condition of turbulence to one of substantially laminar flow. This flow impinges and jets upon a rotor unit 16 and then continues through a downstream spindle plate 17 (again force fitted into pipe section 10) to isolate the liquid turbulence downstream from the rotor 16. Rotor 16 rotates around its axis and the speed of rotation is proportional to the liquid flow rate.

This speed is sensed by the plastic clip-on unit shown in FIG. 3 which includes a plastic clamp 18 and a commercially available sensing unit 19 which senses the magnetic polarization which has been imposed on rotor 16 (to be discussed below). In any case the sensing unit is available from Sensor Engineering Company of Hamden, Conn. under the Model 2000 Wiegand Effect.

Figure 4:
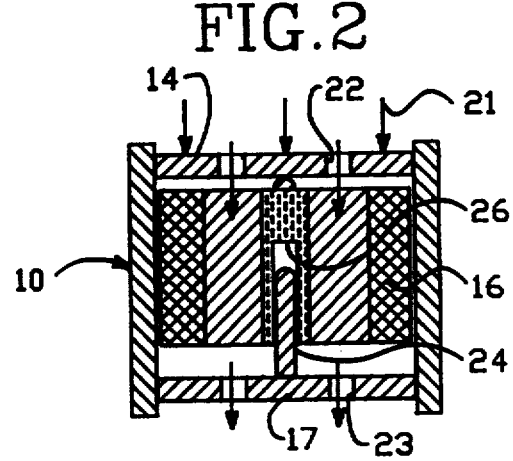
FIG. 4 is a simplified enlarged cross-section of FIG. 1 illustrating one aspect of the operation of the invention.

FIG. 4 illustrates in simplified manner the operation of the invention where the arrows 21 indicate fluid flow. Basically rotor 16 includes a number of turbine blades and the flow control plate 14 has apertures 22 which in addition to converting turbulence to laminar flow breaks up the columnar flow in the upstream portion of pipe 10 into jets which drive the rotor. Spindle plate 17 has apertures 23 to allow the water to escape downstream and also isolates the rotor 16 from any downstream turbulence. As clearly illustrated in FIG. 4, spindle plate 17 includes a shaft 24 which extends into a collar 26 in rotor 16 to allow the rotor to freely rotate around the axis formed by shaft 24. In addition to allowing rotation around this axis, it of course restricts the movements of the rotor perpendicular to the shaft 24; at the same time, it allows movement along the axis as aptly illustrated by FIGS. 5A and 5B.

Figure 5A:
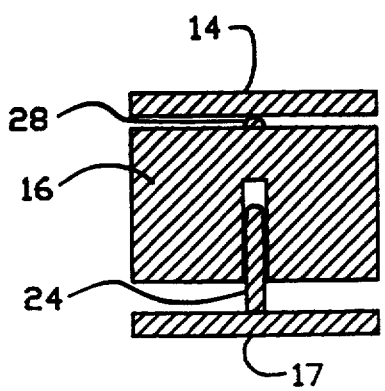
FIGS. 5A and 5B are simplified cross-sectional views based on FIG. 4 which show another aspect of the operation of the present invention.
Figure 5B:
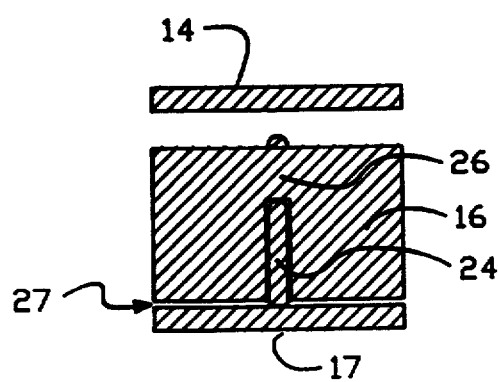

As illustrated in FIG. 5B, this is the rest or low velocity position of rotor 16 where the end of the collar 26 is against the top of spindle or shaft 24. This provides a clearance at 27 with the spindle plate 17 to still allow rotation. Then when the rotor rotates at a sufficient speed, it causes the rotor 16 to float along the axis of shaft 24 so that the nub 28 mounted along the axis of shaft 24 is in engagement with the bottom of plate 14.

The foregoing thus provides a very simple accurate and economical bearing arrangement.

Figure 6:
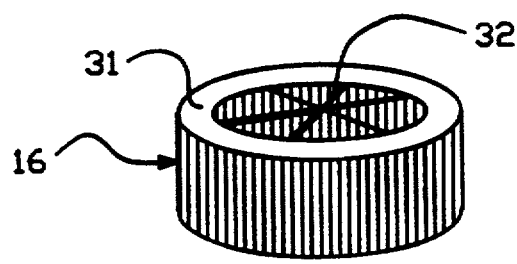
FIG. 6 is a perspective view of the rotor component of the invention.

FIG. 6 illustrates rotor 16 in greater detail which includes a magnetically polarized sleeve 31 in which is affixed a set of rotor blades 32.

Figure 7:
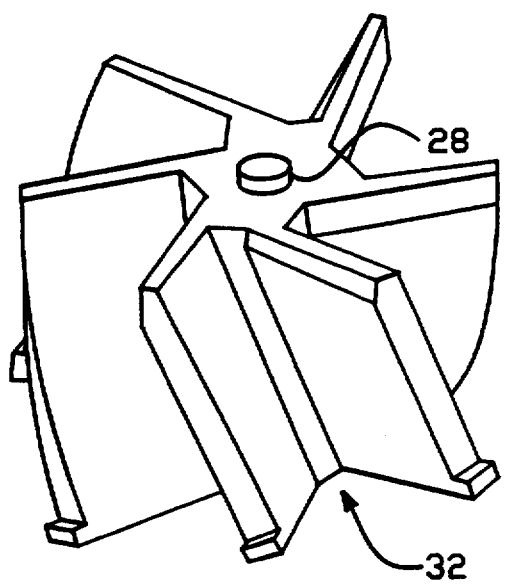
FIG. 7 is a perspective view of the turbine blade component of FIG. 6.

FIG. 7 illustrates the blades 32 in greater detail where each blade is an effectively flat blade extending from the collar 26 and there are six blades. Alternatively in a more sophisticated embodiment, they could be helically shaped.

Figure 8:
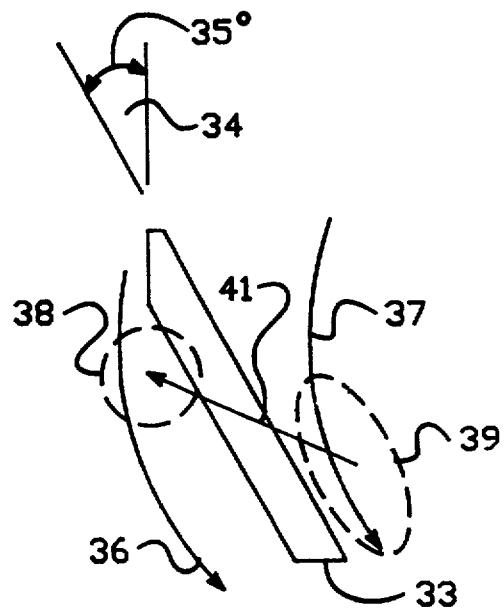
FIG. 8 is a diagrammatic view showing a single turbine blade of FIG. 7 and the effect of liquid flow on it.

FIG. 8 illustrates a single blade 33 which is installed at an optimum angle in the present embodiment as shown at 34 of approximately 35°. A jet of water impinging on the blade is shown by the arrows 36 and 37. As in the case, for example, of an airplane wing, the flow lines 36 an 37 create at the area of 38, an area of low pressure, and at the area of 39, a area of high pressure. Thus there is a net force as shown by the vector 41 which tends to move the blade and thus the rotor in a direction opposite to the flow upstream. In other words, this produces the floating or lift of the rotor illustrated both in FIG. 4 and FIG. 5A. The angle of the blade influences the transfer of the energy. At relatively low angles of attack of less than 35°, a low pressure area 38 is located above the center of the assembly generating the lift to produce the desired floating effect of the present invention.

In the design of the present invention flow rates of approximately two gallons per minute are sufficient to raise the rotor 16 off the top of the shaft 24 (see FIG. 5A). At higher speeds the rotor 16 will be restrained as illustrated in FIG. 5A by flow control plate 14 and rests on the bearing nub 28 extending from turbine 16.

Figure 3:
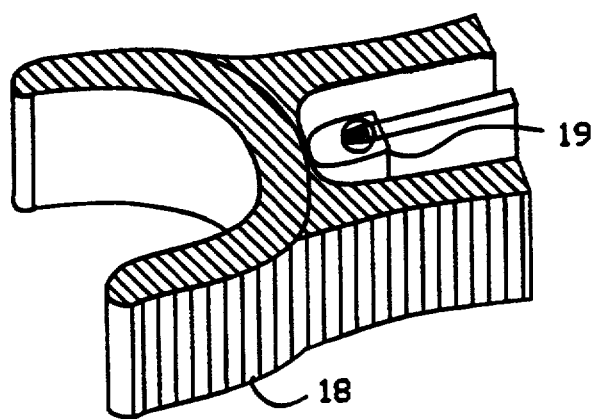
FIG. 3 is a simplified perspective view of an attachment to FIG. 1 which senses rotational speed.
Figure 9:
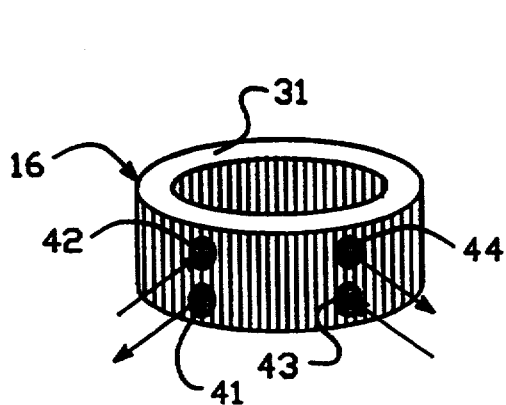
FIG. 9 is a perspective view of one embodiment of a magnetic sleeve component of the rotor of FIG. 6.

As mentioned above, the rotation of the rotor 16 is sensed by a coil 19 as illustrated in FIG. 3. This is because of the magnetic polarization of rotor 16. There are two possible forms of polarization, one is shown in FIG. 9 and the other in FIG. 10. In the implementation of FIG. 9, the rotor 16 includes a sleeve 31 of a relatively thin plastic material, for example, 0.4 inches in height with a wall diameter of 0.690 inches and with a wall thickness of 0.072 inches. Imbedded in the plastic walls of sleeve 31 are dot magnetics 41, 42, for one pair of poles and 43, 44 for an opposite set of poles for a total of eight magnetic poles (4 pairs) which are radially aligned and alternate as illustrated in FIG. 9. The arrows show the alternation of polarity.

Figure 10:
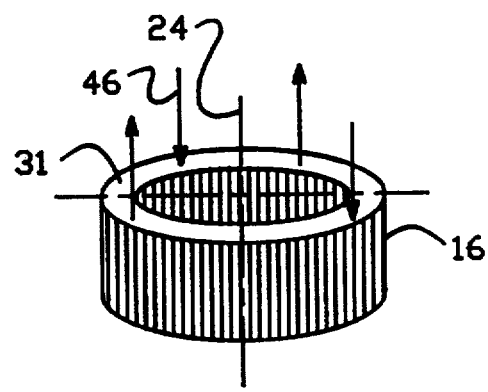
FIG. 10 is a perspective view of an alternative embodiment of FIG. 9.

The alternative embodiment of FIG. 10 also includes the plastic sleeve 31 but here there is blended into the plastic material magnetic particles which, for example, may be neodymium doped material which is available under the brand NN250 from Dynacast Corporation. The polarization here is indicated by the arrows 46 and as is apparent the magnetization is in the longitudinal direction along the axis 24. In the embodiment of FIG. 4 there are four sections of axial magnetization with alternating polarization.

In general the choice of the magnetization is dictated by the type of sensor 19 (FIG. 3) chosen. The number of poles is a design decision based on the magnetic induction pulses desired for each blade rotation.

With regard to the design of the blades 32, as illustrated in FIG. 7, the overall angle of the blades can be varied to obtain accuracy over different velocity rates. A change to a helical type blade can be used in the case of liquids or fluids which have a different viscosity.

In general, the rotor 16 may be regarded as a type of ducted turbine.

Figure 11:
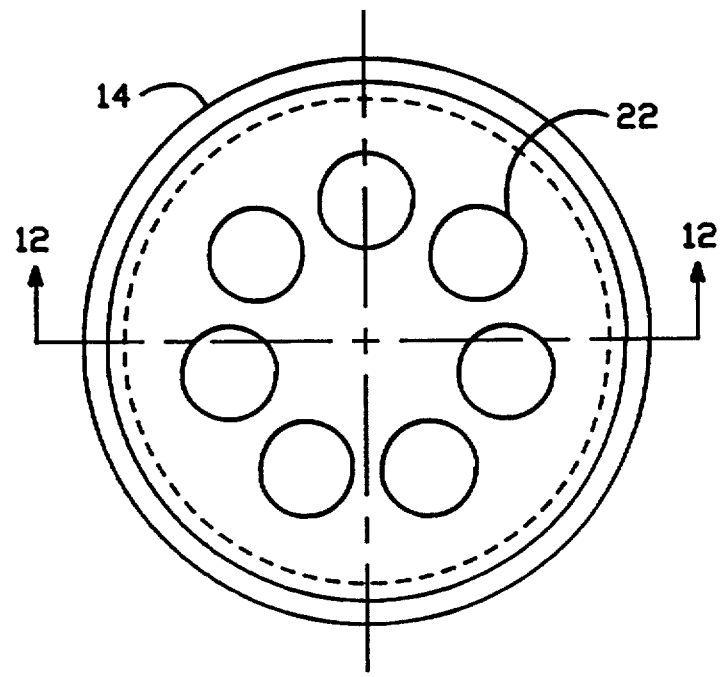
FIG. 11 is a plan view of an upstream component of FIG. 1.
Figure 12:
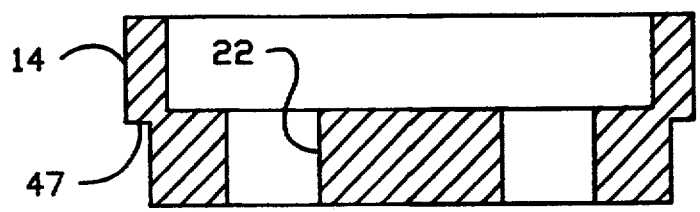
FIG. 12 is a cross-sectional view taken along the line 12—12 of FIG. 11.

FIGS. 11 and 12 illustrate in greater detail the flow control plate 14 which in the optimum embodiment has a circular ring of seven apertures. Each aperture has a diameter typically in the present embodiment of 0.125 inches and the overall diameter of the plate is 0.731 inches. As best illustrated in FIG. 12 the plate includes a step 47 which is wedged into a mating step 48 illustrated in FIG. 2 of the pipe section 10. As discussed above the apertures 22 change the turbulent flow to laminar and form it into jets which impinge upon the turbine blades 32.

Figure 2:
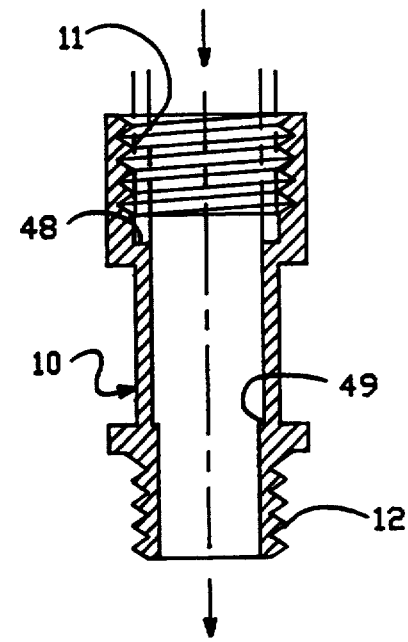
FIG. 2 is a cross-sectional view of a pipe coupling in which the present invention would be installed.
Figure 13:
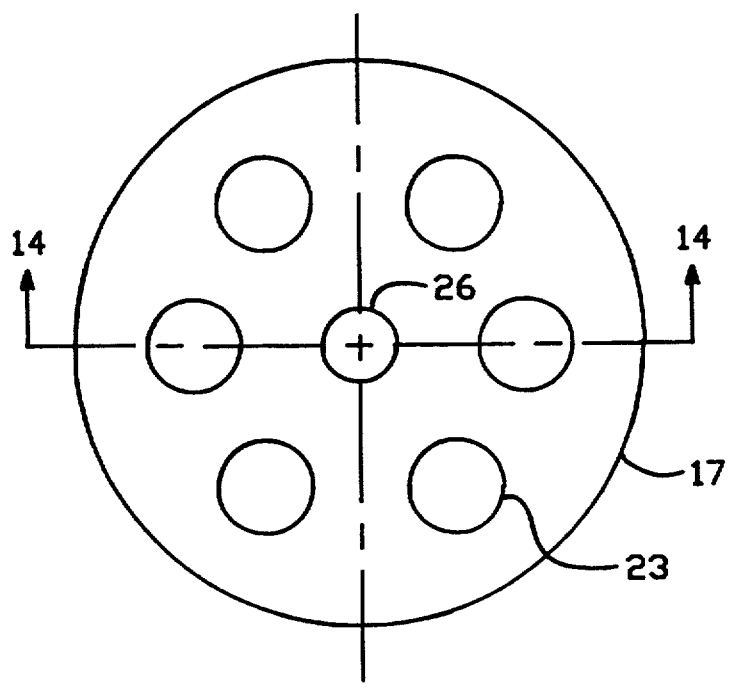
FIG. 13 is a plan view of a downstream component of FIG. 1.
Figure 14:
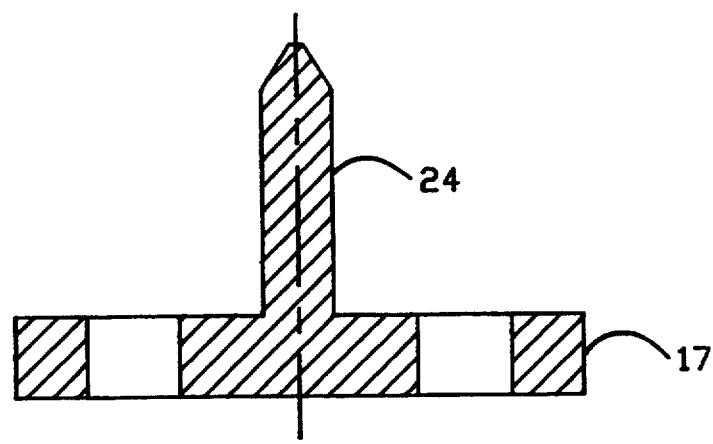
FIG. 14 is a cross-sectional view taken along the line 14—14 of FIG. 13.

FIGS. 13 and 14 show the downstream spindle plate 17 which includes its apertures 23 also circularly arranged in a circular ring and of the same diameter as the apertures 22 of the flow control plate. However, in this case there are only six apertures. This makes one less than in the flow control plate and somewhat restricts the flow and in effect insures that the rotor 16 will be completely immersed and thus the floating effect to thus reduce drag in bearing loads and at the same time improve accuracy. As best illustrated in FIG. 2, there is also a step in pipe section 10 on which the spindle plate 17 rests and is force fitted. The spindle plate 17 and the flow control plate 18 may be constructed of relatively corrosion free and lightweight material such as a polyester material available form General Electric Company under the model number GE Valox 420.

In general operation, the flow control plate 14 and the spindle plate 17 are both relatively thin compared to rotor 16. The short flow control and spindle plates are thus much less constrictive to fluid flow but still serve the purpose of reducing or isolating turbulence from the rotor to improve accuracy. The ducted turbine type rotor acts much like a Venturi to improve the accuracy of low flow rate performance measurement. Using a flow control plate 14 with one more aperture than the number of blades insures that the drive on the blades will be relatively constant. This, of course, is in conjunction with the use of one less aperture in the spindle plate 17 which causes a full immersion of turbine 16. In addition as best illustrated both in FIGS. 1 and 2, the pipe 10, at the location of the rotor, because of step 48, is constricted to cause a Venturi flow action which is believed to be beneficial.

Thus an improved apparatus for measuring liquid flow and the process therefor has been provided.

What is claimed is:

1. A process for measuring a liquid flow where a turbine rotor, having blades, in the path of the liquid flow rotates around its axis at a speed proportional to the liquid flow rate comprising the following steps:

mounting said rotor on said axis to allow free movement along said axis but restricted movement perpendicular to said axis;

converting the liquid upstream of said rotor from a condition of turbulence to one of substantially laminar flow with a plurality of laminar flow jets impinging upon said rotor to rotate it and to force said rotor in a downstream direction;

setting the angle of said blades of said rotor to produce an upstream force in response to impingement of said laminar flow jets to cause said rotor to float along said axis in an upstream direction;

and sensing rotational speed of said rotor.

2. Apparatus for measuring a liquid flow where a turbine rotor in the path of the liquid flow rotates around its axis at a speed proportional to the liquid flow rate comprising:

means for mounting said rotor on said axis to allow relatively free movement along said axis but restricted movement perpendicular to said axis;

apertured disk means for converting the liquid upstream of said rotor from a condition of turbulence to one of substantially laminar flow with a plurality of laminar flow jets impinging upon said rotor to rotate it and to force said rotor in a downstream direction;

said rotor including blades which are angled to provide an upstream force in response to impingement of said laminar flow jets to cause said rotor to float;

and means for sensing rotational speed of said rotor.

3. Apparatus as in claim 2 wherein said turbine rotor includes a magnetically polarized sleeve to which said blades are affixed.

4. Apparatus as in claim 3 where said means for sensing rotational speed includes pick-up means for sensing said magnetic polarization of said sleeve.

5. Apparatus as in claim 2 where the axial dimension of said disk is much less than said rotor.

6. Apparatus as in claim 2 where said rotor is in close proximity to said disk means and where said rotor has a predetermined number or blades and the number of apertures of said apertured disk, which are in a circular ring, is one greater.

7. Apparatus as in claim 2 including means downstream of said rotor for maintaining laminar flow of liquid exiting from said rotor.

8. Apparatus as in claim 7 where said maintaining means includes a disk with a circular ring of apertures equal in number to said number of blades.

9. Apparatus as in claim 7 where said maintaining means includes a disk with a circular ring of apertures which provide a smaller flow area than said apertures of said converting means for completely immersing said rotor in liquid.

10. Apparatus as in claim 7 where said means for mounting includes a shaft extending from said maintaining means and said rotor includes a central collar which rotates on said shaft.

11. Apparatus as in claim 10 where said rotor includes a bearing member extending from its central axis on its upstream side to provide a bearing for rotation against said apertured disk if said upstream force exceeds said downstream force.

* * * * *